United States Patent
Zhou

(10) Patent No.: US 11,617,180 B2
(45) Date of Patent: Mar. 28, 2023

(54) METHODS AND APPARATUSES FOR TRANSMITTING INFORMATION, BASE STATIONS AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 199 days.

(21) Appl. No.: 17/054,476

(22) PCT Filed: May 11, 2018

(86) PCT No.: PCT/CN2018/086593
§ 371 (c)(1),
(2) Date: Nov. 10, 2020

(87) PCT Pub. No.: WO2019/213963
PCT Pub. Date: Nov. 14, 2019

(65) Prior Publication Data
US 2021/0058918 A1    Feb. 25, 2021

(51) Int. Cl.
*H04W 72/04* (2009.01)
*H04W 52/14* (2009.01)
*H04W 88/02* (2009.01)

(52) U.S. Cl.
CPC ....... *H04W 72/048* (2013.01); *H04W 52/146* (2013.01); *H04W 72/0493* (2013.01); *H04W 88/023* (2013.01)

(58) Field of Classification Search
CPC ............ H04W 72/048; H04W 52/146; H04W 72/0493; H04W 88/023; H04W 52/0258; H04W 52/028; H04B 17/102
See application file for complete search history.

(56) References Cited

U.S. PATENT DOCUMENTS

| 2017/0332333 A1 | 11/2017 | Santhanam et al. |
| 2019/0081657 A1* | 3/2019 | Zeng ..................... H04B 1/711 |

FOREIGN PATENT DOCUMENTS

| CN | 101754288 A | 6/2010 |
| CN | 102740346 A | 10/2012 |

(Continued)

OTHER PUBLICATIONS

"Discussion on solutions to satisfy SAR requirements for NR HPUE", CMCC, 3GPP TSG-RAN WG4 Meeting #86bis, R4-1804016 (Year: 2018).*

(Continued)

*Primary Examiner* — Walter J Divito
*Assistant Examiner* — Anthony Luo
(74) *Attorney, Agent, or Firm* — Arch & Lake LLP

(57) ABSTRACT

Methods and apparatuses are provided for transmitting information. The method includes: determining whether the UE supports a preset adjustment function, where the preset adjustment function instructs a base station to dynamically adjust resource configuration information for the HPUE based on SAR capability information of the UE; if the UE supports the preset adjustment function, determining target resource configuration information corresponding to a preset high power mode; and transmitting information according to the target resource configuration information in the preset high power mode.

19 Claims, 10 Drawing Sheets

(56) References Cited

FOREIGN PATENT DOCUMENTS

| CN | 106165518 A | 11/2016 |
|---|---|---|
| CN | 106211177 A | 12/2016 |
| CN | 107872834 A | 4/2018 |

OTHER PUBLICATIONS

International Search Report of PCT Application No. PCT/CN2018/086593 dated Jan. 9, 2019 and English translation (4p).

VIVO, "Further Discussion on NR TDD UL/DL Configurations and HPUE Behaviour" 3GPP TSG-RAN WG4 Meeting#86, R4-1802713, Athens, Greece, Feb. 26, 2018, (5p).

State Intellectual Property Office of the People's Republic of China, Office Action and Search Report Issued in Application No. 201880000672.9, dated Jun. 15, 2021, Submitted with Machine/Partial Translation, (27p).

First Office Action issued to Chinese Application No. 201880000672.9 dated Dec. 31, 2020 with English translation, (28p).

International Preliminary Report on Patentability and Written Opinion of PCT Application No. PCT/CN2018/086593 dated Jan. 9, 2019 and English translation, (9p).

CMCC, "Discussion on solutions to satisfy SAR requirements for NR HPUE", 3GPP TSG-RAN WG4 Meeting #86bis, R4-1804016, Melbourne, Australia, Apr. 16-20, 2018, (4p).

State Intellectual Property Office of the People's Republic of China, Second Office Action and Search Report issued in Application No. 201880000672.9, dated Mar. 11, 2021, submitted with machine/partial translation, (22p).

Extended European Search Report issued in Application No. 18918137.3 dated Apr. 28, 2021, (8p).

RAN WG4, "LS on the UE Capability of Max Uplink Duty Cycle for NR FR1 Power Class 2 UE",3GPP TSG RAN WG2#102,Busan, Korea, R2-1806637, May 21-25, 2018; 3GPP TSG-RAN WG4 Meeting #86bis,Melbourne, AU, R4-1805786,16th-20th Apr. 16-20, 2018, (1p).

* cited by examiner

METHODS AND APPARATUSES FOR TRANSMITTING INFORMATION, BASE STATIONS AND USER EQUIPMENT

CROSS REFERENCE TO RELATED APPLICATIONS

The present application is the U.S. national phase of PCT Application No. PCT/CN2018/086593 filed on May 11, 2018, which is incorporated herein by reference in its entirety for all purposes.

TECHNICAL FIELD

The present disclosure relates to the field of communication technologies, and in particular, to methods and apparatuses for transmitting information, base stations, and user equipment.

BACKGROUND

When 5G NR (New Radio) and LTE (Long Term Evolution) are deployed, an uplink transmission power of UE (User Equipment) is classified by power class. For example, power class 3 is 23 dBm, which is a typical uplink transmission power of UE. In some application scenarios, for example, when the UE is operating in a higher frequency band such as 3.5 GHz, to ensure the increase of uplink coverage, the UE is required to have a higher uplink transmission power, such as 26 dBm (power class 2) and so on. The UE transmitting in a preset high power mode, e.g., high power class, is called High Power UE (HPUE).

Since the transmission power of UE in the preset high power mode is relatively high, if an uplink/downlink resource ratio of resource configured by a base station for the UE in a HPUE mode is not appropriate, wireless signal radiation of the UE in the HPUE mode will exceed a preset Specific Absorption Rate (SAR) measurement standard, causing harm to the human body.

SUMMARY

To overcome the problems in related technologies, examples of the present disclosure provide methods and apparatuses for transmitting information, base stations, and user equipment, so that the UE working in a preset high power mode can transmit uplink information with an appropriate uplink proportion, which effectively improves the uplink transmission capacity without exceeding a preset SAR measurement standard.

According to the first aspect of the present disclosure, there is provided a method of transmitting information, which is applicable to user equipment, and the method includes:

determining whether the UE supports a preset adjustment function, where the preset adjustment function instructs a base station to, based on specific absorption rate (SAR) capability information of the UE, dynamically adjust resource configuration information for the UE when the UE is in a high power mode (HPUE);

determining, in response to that the UE supports the preset adjustment function, target resource configuration information corresponding to a preset high power mode; and transmitting, when being in the preset high power mode, information according to the target resource configuration information.

Optionally, the method further includes:

setting, in response to that the UE does not support the preset adjustment function, resource configuration information corresponding to a second preset high power mode as the target resource configuration information.

Optionally, determining the target resource configuration information corresponding to the preset high power mode includes:

determining whether the UE currently supports the preset adjustment function;

sending, in response to that the preset adjustment function is currently supported, supported indication information to the base station, where the supported indication information includes the SAR capability information of the UE; and receiving the target resource configuration information dynamically adjusted by the base station based on the SAR capability information.

Optionally, the SAR capability information includes: a reference uplink proportion, or a SAR indication value corresponding to a preset uplink proportion.

Optionally, sending the supported indication information to the base station is triggered by at least one of that:

volume of service to be transmitted by the UE meets a preset traffic condition;

the UE moves to a preset cell edge area;

power consumption of the UE meets a preset power consumption condition; or area movement information of the UE meets a preset terminal control condition.

Optionally, sending the supported indication information to the base station includes:

sending, to the base station, a preset indication value indicating that the UE currently supports the preset adjustment function; and/or sending, to the base station, the SAR capability information corresponding to the preset high power mode, such that the base station dynamically adjusts the resource configuration information based on the SAR capability information.

Optionally, determining the target resource configuration information corresponding to the preset high power mode further includes:

sending, in response to that the preset adjustment function is not currently supported, unsupported indication information to the base station; and receiving the target resource configuration information determined by the base station in response to the unsupported indication information, where the target resource configuration information includes resource configuration information preset by the base station for the preset high power mode.

Optionally, transmitting information according to the target resource configuration information includes:

determining whether the target resource configuration information is currently valid according to preset aging information; and transmitting, in response to that the target resource configuration information is valid, information according to the target resource configuration information.

According to the second aspect of the present disclosure, there is provided a method of transmitting information, which is applicable to a base station, and the method includes:

receiving preset indication information from UE, where the preset indication information indicates that the UE supports a preset adjustment function, and the preset adjustment function instructs the base station to, based on SAR capability information of the UE, dynamically adjust resource configuration information for the UE when the UE is in a high power mode (HPUE);

determining target resource configuration information for the UE in a preset high power mode according to the preset indication information; and sending the target resource configuration information to the UE, such that the UE transmits information according to the target resource configuration information when the UE is configured in the preset high power mode.

Optionally, receiving the preset indication information from the UE includes:

receiving a preset indication value and the SAR capability information corresponding to the preset high power mode from the UE, where the preset indication value indicates that the UE currently supports the preset adjustment function; or receiving the SAR capability information corresponding to the preset high power mode from the UE; and determining the target resource configuration information for the UE in the preset high power mode according to the preset indication information includes:

determining a target uplink proportion according to the SAR capability information; and determining the target resource configuration information for the preset high power mode based on the target uplink proportion.

Optionally, the SAR capability information includes: a reference uplink proportion; and determining the target uplink proportion according to the SAR capability information includes:

determining the target uplink proportion according to the reference uplink proportion, where the target uplink proportion is less than or equal to the reference uplink proportion.

Optionally, the SAR capability information includes SAR indication value corresponding to a preset uplink proportion; and determining the target uplink proportion according to the SAR capability information includes:

determining the target uplink proportion according to a preset SAR upper limit and the SAR indication value corresponding to the preset uplink proportion.

Optionally, receiving the preset indication information from the UE includes:

receiving unsupported indication information from the UE; and determining the target resource configuration information for the UE in the preset high power mode according to the preset indication information includes:

determining resource configuration information preset for the preset high power mode as the target resource configuration information for the UE.

According to the third aspect of the present disclosure, there is provided an apparatus for transmitting information, which is applicable to user equipment, and the apparatus includes:

a function determining module configured to determine whether the UE supports a preset adjustment function, where the preset adjustment function instructs a base station to, based on specific absorption rate (SAR) capability information of the UE, dynamically adjust resource configuration information for the UE when the UE is in a high power mode (HPUE);

a first resource configuring module configured to determine, in response to that the UE supports the preset adjustment function, target resource configuration information corresponding to a preset high power mode; and a transmitting module configured to transmit, when being in the preset high power mode, information according to the target resource configuration information.

Optionally, the apparatus further includes:

a second resource configuring module configured to set, in response to that the UE does not support the preset adjustment function, resource configuration information corresponding to a second preset high power mode as the target resource configuration information.

Optionally, the first resource configuring module includes:

a function determining submodule configured to determine whether the UE currently supports the preset adjustment function;

a support information sending submodule configured to send, in response to that the preset adjustment function is currently supported, supported indication information to the base station, where the supported indication information includes the SAR capability information of the UE; and a first configuration information receiving submodule configured to receive the target resource configuration information dynamically adjusted by the base station based on the SAR capability information.

Optionally, the SAR capability information includes a reference uplink proportion, or a SAR indication value corresponding to a preset uplink proportion.

Optionally, the support information sending submodule configured to send the supported indication information to the base station is triggered by at least one that:

volume of service to be transmitted by the UE meets a preset traffic condition;

the UE moves to a preset cell edge area;

power consumption of the UE meets a preset power consumption condition; or area movement information of the UE meets a preset terminal control condition.

Optionally, the support information sending submodule includes:

an indication unit configured to send, to the base station, a preset indication value indicating that the UE currently supports the preset adjustment function; and/or a SAR capability reporting unit configured to send, to the base station, the SAR capability information corresponding to the preset high power mode, such that the base station dynamically adjusts the resource configuration information based on the SAR capability information.

Optionally, the first resource configuring module further includes:

a non-support information sending submodule configured to send, in response to that the preset adjustment function is not currently supported, unsupported indication information to the base station; and a second configuration information receiving submodule configured to receive the target resource configuration information determined by the base station in response to the unsupported indication information, where the target resource configuration information includes resource configuration information preset by the base station for the preset high power mode.

Optionally, the transmitting module includes:

an aging detecting submodule configured to determine whether the target resource configuration information is currently valid according to preset aging information; and an information transmitting submodule configured to transmit, in response to that the target resource configuration information is valid, information according to the target resource configuration information.

According to the fourth aspect of the present disclosure, there is provided an apparatus for transmitting information, which is applicable to a base station, and the apparatus includes:

an information receiving module configured to receive preset indication information from UE, where the preset indication information indicates that the UE supports a preset adjustment function, and the preset adjustment function instructs the base station to, based on SAR capability information of the UE, dynamically adjust resource configuration information for the UE when the UE is in a high power mode (HPUE);

a resource configuring module configured to determine target resource configuration information for the UE in a preset high power mode according to the preset indication information; and a sending module configured to send the target resource configuration information to the UE, such that the UE transmits information according to the target resource configuration information when the UE is configured in the preset high power mode.

Optionally, the information receiving module includes:

a first receiving submodule configured to receive a preset indication value and the SAR capability information corresponding to the preset high power mode from the UE, where the preset indication value indicates that the UE currently supports the preset adjustment function; and a second receiving submodule configured to receive the SAR capability information corresponding to the preset high power mode from the UE; and the resource configuring module includes:

an uplink proportion determining submodule configured to determine a target uplink proportion according to the SAR capability information; and a configuration information determining submodule configured to determine the target resource configuration information for the preset high power mode based on the target uplink proportion.

Optionally, the SAR capability information includes a reference uplink proportion; and the uplink proportion determining submodule includes:

a first determining unit configured to determine the target uplink proportion according to the reference uplink proportion, where the target uplink proportion is less than or equal to the reference uplink proportion.

Optionally, the SAR capability information includes a SAR indication value corresponding to a preset uplink proportion; and the uplink proportion determining submodule includes:

a second determining unit configured to determine the target uplink proportion according to a preset SAR upper limit and the SAR indication value corresponding to the preset uplink proportion.

Optionally, the information receiving module includes:

a third receiving submodule configured to receive unsupported indication information from the UE; and the resource configuring module is configured to determine resource configuration information preset for the preset high power mode as the target resource configuration information for the UE.

According to the fifth aspect of the present disclosure, there is provided a non-transitory computer-readable storage medium storing computer instructions that, when executed by a processor, implement the steps of any one of the methods described in the first aspect.

According to the sixth aspect of the present disclosure, there is provided a non-transitory computer-readable storage medium storing computer instructions that, when executed by a processor, implement the steps of any one of the methods described in the second aspect.

According to the seventh aspect of the present disclosure, there is provided user equipment, including:

a processor, and a memory for storing instructions executable by the processor, where, the processor is configured to:

determine whether the UE supports a preset adjustment function, where the preset adjustment function instructs a base station to, based on SAR capability information of the UE, dynamically adjust resource configuration information for the UE when the UE is in a high power mode (HPUE);

determine, in response to that the UE supports the preset adjustment function, target resource configuration information corresponding to a preset high power mode; and transmit, when being in the preset high power mode, information according to the target resource configuration information.

According to the eighth aspect of the examples of the present disclosure, there is provided a base station, including:

a processor, and a memory for storing instructions executable by the processor, where, the processor is configured to:

receive preset indication information from UE, where the preset indication information indicates that the UE supports a preset adjustment function, and the preset adjustment function instructs the base station to, based on SAR capability information of the UE, dynamically adjust resource configuration information for the UE when the UE is in a high power mode (HPUE);

determine target resource configuration information for the UE in a preset high power mode according to the preset indication information; and send the target resource configuration information to the UE, such that the UE transmits information according to the target resource configuration information when the UE is configured in the preset high power mode.

The technical solutions provided by the examples of the present disclosure may include the following beneficial effects.

The methods of transmitting information provided in the present disclosure can determine the corresponding target resource configuration information for the UE in the preset high power mode, and ensure that after the UE is configured to the preset high power mode, on SAR exceedance occurs when uplink information is transmitted according to the target resource configuration information, thereby ensuring that the amount of radiation generated by the UE in the preset high power mode will not affect health of a terminal user, and improving uplink information transmission capability of the UE in the preset high power mode.

It should be understood that the above general description and the following detailed description are merely exemplary and explanatory and do not limit the disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
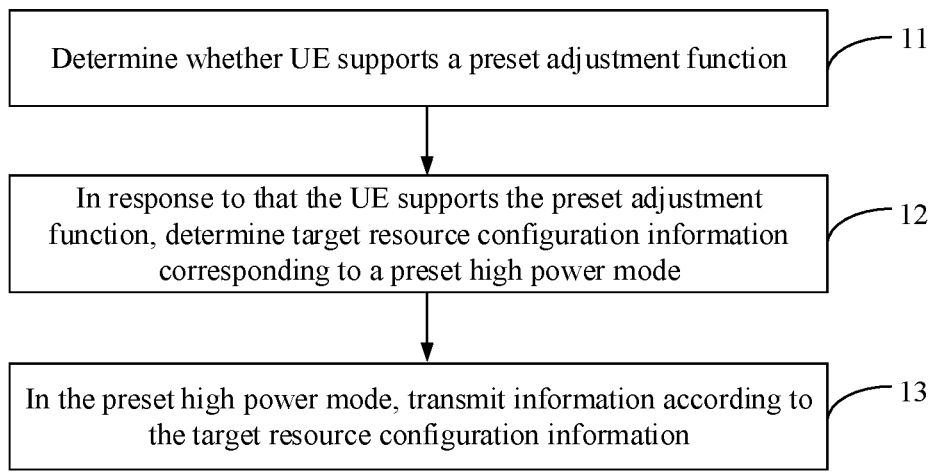
FIG. 1 is a flowchart illustrating a method of transmitting information according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the word "if" as used herein may be interpreted as "when" or "upon" or "in response to determining".

The execution subject of the present disclosure includes a base station and User Equipment (UE), where the base station may be a base station with a large-scale antenna array, or a sub-base station with a large-scale antenna array, and so on. The UE may be a user terminal, a user node, a mobile terminal, a tablet computer, etc. In the specific implementation process, the base station and the user equipment are independent of each other, and at the same time are connected to each other, so as to implement the technical solutions provided by the present disclosure together.

The method of transmitting information provided by the present disclosure can be applicable to an LTE system, a 5G NR system, or a network where LTE and NR systems are deployed simultaneously, and the present disclosure is not limited thereto.

Before introducing the technical solutions of the present disclosure, technical terms related to the present disclosure are first introduced.

SAR (Specific Absorption Rate), indicating how much energy is absorbed per unit mass by a human body, in watts per kilogram (W/Kg), is an indicator for a UE design, and the indicator measures an amount of radiation to the human body when the UE emits wireless signals. Taking the UE as a mobile phone as an example, different geographic areas have different SAR measurement standards for a mobile phone. For example, a SAR measurement standard for the mobile phone in Europe is 1.6 W/Kg, while a SAR measurement standard for the mobile phone in the United States and China is 2.0 W/Kg. When operating in the geographic area described above, the mobile phone needs to meet the SAR measurement standard specified for that area. For example, when a mobile phone operates in Europe, the maximum SAR value of the mobile phone working in any mode cannot exceed a preset SAR upper limit, that is, 1.6-W/Kg.

The SAR value of the UE relates to an uplink transmission power and an uplink proportion in a resource configuration. If the UE is configured in a HP (High Power) mode, that is, a HPUE mode, when the uplink proportion in the resource configuration is relatively large, a cumulative amount of radiation within a unit information transmission time interval, such as 10 ms, may exceed a preset SAR upper limit. The uplink proportion refers to a duty cycle, representing a ratio of a duration corresponding to uplink transmission resources in the unit information transmission time interval when the base station configures resources for the UE. For example, the duty cycle is 50%. The 50% means that within a unit information transmission time interval, 50% of the time domain resources are configured as the uplink transmission resources.

With respect to the high power mode, a 5G NR system may follow an approach of an LTE system in which the transmission power of UE is classified, and the high power mode of UE is indicated by a preset power class value. Taking the LTE system as an example, power class 3 corresponding to a transmission power of 23 dBm, which indicates a normal power transmission mode, is not a high power mode. Power class 2 corresponding to a transmission power of 26 dBm, indicates a high power mode. Power class 1 and power class 0 indicate two high power modes with a higher transmission power. In the 5G NR system, a power class division manner and a power class value corresponding to the high power mode may be changed compared to the LTE system, and should not be understood as a limitation of the solutions of the present disclosure.

Based on this, the present disclosure provides a method of transmitting information, which determines resource configuration information in an HPUE mode according to a preset strategy, so as to ensure that the UE operates in a high power mode and no SAR exceedance problem occurs.

Referring to FIG. 1, a flowchart illustrating a method of transmitting information is shown according to an example. The method is applicable to UE and includes the followings.

At step 11, it is determined whether the UE supports a preset adjustment function. The preset adjustment function instructs a base station to, based on SAR capability information of the UE, dynamically adjust resource configuration information for the UE when the UE is in a high power mode (HPUE).

In the present disclosure, the preset adjustment function refers to dynamically adjusting, by the base station, the resource configuration information for the HPUE according to the SAR capability information of the UE.

In the present disclosure, for UE accessed the network, such as smart phone A, the UE can determine whether the UE itself supports the preset adjustment function according to its own device information such as a capability of a radio frequency transceiver module. That is, smart phone A can determine whether smart phone A supports a function instructing the base station to dynamically adjust resource configuration information for smart phone A in the high power mode based on SAR capability information of smart phone A. If the UE supports the preset adjustment function, perform step 12 below.

At step 12, in response to that the UE supports the preset adjustment function, target resource configuration information corresponding to a preset high power mode is determined.

As in the example, if smart phone A supports the preset adjustment function, smart phone A supports a function that the base station dynamically adjusts resource configuration information for smart phone A in the preset high power mode based on SAR capability information of smart phone A.

In an example of the present disclosure, the UE may report device capability information to the base station when accessing the cell network. Alternatively, the UE may report, to the base station, adjustment capability information when it reports its own power class to the base station, where the adjustment capability information indicates that the UE supports the preset adjustment function. The adjustment capability information includes at least SAR capability information of the UE, such that when the UE is to dynamically adjust the resource configuration information in the HPUE mode, the base station dynamically adjusts an uplink proportion for the UE in the HPUE mode according to the SAR capability information of the UE.

In another example of the present disclosure, when the UE determines the preset adjustment function is supported, the UE may further determine whether the preset adjustment function is currently supported according to a preset strategy, and different indication information is reported to the base station according to the determination result.

Figure 2:
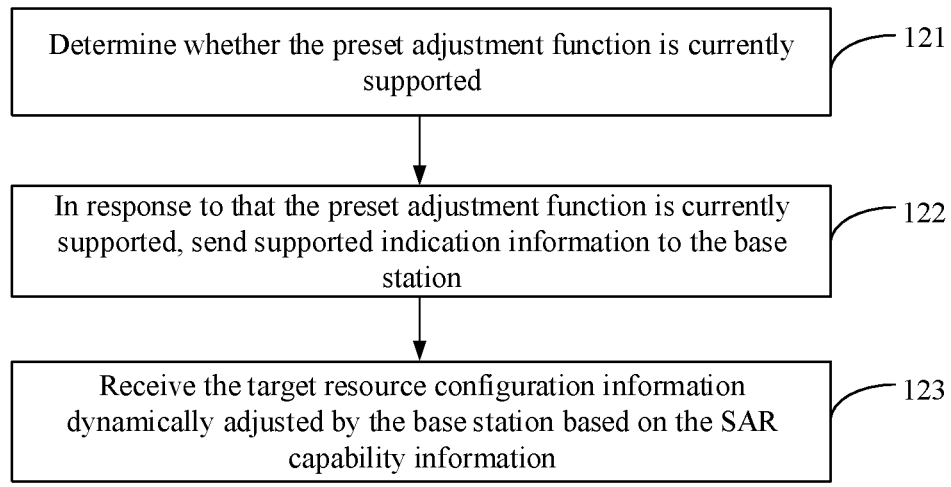
FIG. 2 is a flowchart illustrating another method of transmitting information according to an example of the present disclosure.

Referring to FIG. 2, a flowchart illustrating another method of transmitting information is shown according to an example, step 12 may include the followings.

At step 121, it is determined whether the preset adjustment function is currently supported.

In the present disclosure, the UE can determine whether the base station is currently required to dynamically adjust the uplink proportion in the HPUE mode for the UE according to a preset reference factor. The preset reference factor includes at least one of: volume of service to be transmitted, a current power consumption status, location information within a signal coverage area of a cell, or a terminal control factor.

At step 122, in response to that the preset adjustment function is currently supported, supported indication information is sent to the base station, where the supported indication information includes SAR capability information of the UE.

In the present disclosure, the UE sends supported indication information to the base station under at least one of the following trigger conditions.

Trigger condition 1: in response to that volume of service to be transmitted by the UE meets a preset traffic condition, the supported indication information is sent to the base station, which may include the following three cases.

Case 1: when volume of uplink service to be transmitted by the UE is greater than or equal to a preset uplink traffic threshold, the reporting of the supported indication information is triggered, so as to inform the base station that the UE currently supports dynamic adjusting the resource configuration information in the HPUE mode. Thus, the base station can dynamically adjust the uplink proportion in the HPUE mode for the UE.

In case 1, the UE can count the volume of uplink service to be transmitted currently according to the related art, and compare the volume with the preset uplink traffic threshold. If the volume of uplink service to be transmitted currently is greater than or equal to the preset uplink traffic threshold, the UE may desirable for the base station to increases the uplink proportion in the resource configuration. Therefore, the supported indication information may be reported to the base station. In this way, the base station determines, according to the supported indication information, whether to increase the uplink proportion in the resource configuration based on the SAR capability information; and the UE increases uplink service transmission capacity and reduces uplink service transmission latency.

Case 2: when volume of downlink service for the UE is less than a preset downlink traffic threshold, the reporting of the supported indication information is triggered.

In case 2, the UE can determine the volume of downlink service to be transmitted according to the related art, and compare the volume with the preset downlink traffic threshold. If the volume of downlink service to be transmitted is less than the preset downlink traffic threshold, the UE may report the supported indication information to the base station. Thus, the base station can increase the uplink proportion in the resource configuration according to the supported indication information, thereby avoiding a waste of downlink transmission resources.

Case 3: when a downlink/uplink transmission ratio of the UE is greater than a preset ratio threshold, the reporting of the supported indication information is triggered.

In case 3, the UE can determine a ratio of downlink to uplink traffic to be transmitted according to the related art, assuming that is expressed as R1, and compare a value of that ratio with a preset downlink/uplink traffic ratio threshold R0. If R1 is greater than or equal to R0, the supported indication information is reported to the base station. Thus, the base station determines, according to the supported indication information, whether to increase the uplink proportion in the resource configuration.

Trigger condition 2: in response to that the UE moves to a preset cell edge position, supported indication information is sent to the base station.

In the present disclosure, the UE may compare information, such as a detected RSRP (Reference Signal Received Power), detected RSRQ (Reference Signal Received Quality) or the like, with a preset reference threshold, so as to determine whether the UE moves to the cell edge position. The preset reference threshold refers to a preset signal strength reference value indicating a cell edge position.

Due to poor signal coverage at a cell edge, when the UE moves from a cell center position to the preset cell edge position, to improve the uplink coverage of the UE and ensure uplink information transmission performance of the UE at the cell edge, the UE can report the supported indication information to the base station. Thus, the base station can increase the uplink proportion when configuring resources for the HPUE according to the supported indication information.

Trigger condition 3: in response to that power consumption of the UE meets a preset power consumption condition, the supported indication information is sent to the base station.

Generally, for the UE, sending uplink information consumes more power than receiving downlink information. To ensure performance of the UE, such as battery endurance, a service life, and so on, it is desired to avoid a situation where the power consumption of the UE is excessive by increasing the uplink proportion of the UE when the power consumption of the UE is high. Lead to excessive UE power consumption. Therefore, the UE can report the supported indication information to the base station when the power consumption is low. The preset power consumption condition may include: the power consumption is less than a preset power threshold, a remaining power is greater than a preset electric quantity threshold, or a current temperature of the UE is less than a preset temperature threshold, etc.

Trigger condition 4: in response to that area movement information of the UE meets a preset terminal control condition, the supported indication information is sent to the base station.

In the present disclosure, the area movement information of the UE refers to information indicating that the UE moves from one area to another area. The areas may be areas corresponding to different SAR measurement standards, such as countries. The areas may also be areas covered by base stations that support the preset adjustment function or not.

As mentioned above, SAR is a physical indicator that measures the amount of radiation to the human body when a terminal emits wireless signals. Taking the terminal as a smart phone as an example, different countries may have different SAR measurement standards for mobile phones. For example, the standard used in Europe is 1.6 W/Kg, and the standard used in the United States and China is 2.0 W/Kg. Assuming that smart phone A is carried by a user from Europe to the United States, upon entering the United States, smart phone A can send the supported indication information to a base station in the United States, such that the base station in the United States can increase, according to the supported indication information, the uplink proportion in the resource configuration based on the SAR measurement standard used in the United States.

In another application scenario, the support for preset adjustment function varies among the base stations deployed by different operators. Exemplarily, it is assumed that base stations of a first operator support the preset adjustment function, and base stations of a second operator do not support the preset adjustment function. When the UE roams from a signal coverage area of a base station of the second operator to a signal coverage area of a base station of the first operator, the UE may report the supported indication information to the base station of the first operator which currently supports the preset adjustment function.

It should be noted that the UE may determine whether to send the supported indication information to the base station according to one or more trigger conditions mentioned above. For example, on the basis of determining that the preset terminal control factor is satisfied, the UE may further check whether the preset power consumption condition and preset traffic condition are satisfied, so as to determine whether to send the supported indication information to the base station.

In the present disclosure, the UE may send the supported indication information to the base station in an explicit or implicit manner.

Figure 3:
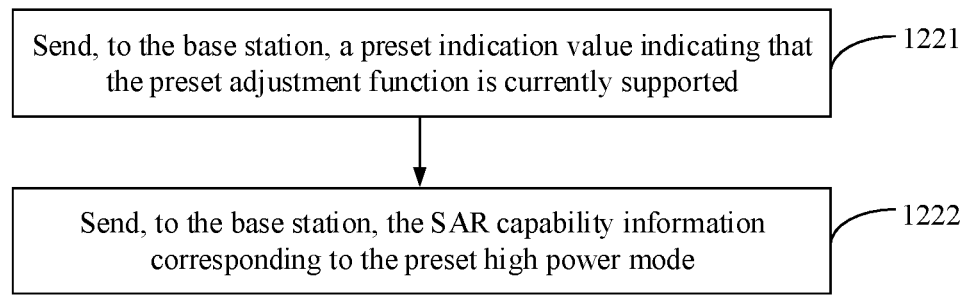
FIG. 3 is a flowchart illustrating another method of transmitting information according to an example of the present disclosure.

If the UE sends the supported indication information to the base station in an explicit manner, referring to FIG. 3, a flowchart illustrating another method of transmitting information is shown according to an example. Step 122 may include the followings.

At step 1221, a preset indication value is sent to the base station, where the preset indication value indicates that the preset adjustment function is currently supported.

In the present disclosure, for an HPUE mode such as power class 2, a preset value of a protocol-defined bit, such as 1, may be used to indicate that the UE currently supports the preset adjustment function. In a case that the UE supports two or more HPUE modes, one bit can also be used to uniformly indicate whether the preset adjustment function is supported in each of the two or more HPUE modes.

At step 1222, the SAR capability information corresponding to the preset high power mode is sent to the base station.

In the examples of the present disclosure, when the UE is configured to a preset HPUE mode, the SAR capability information corresponding to the HPUE mode can be sent to the base station.

In an example of the present disclosure, the SAR capability information may include a reference uplink proportion, and the reference uplink proportion may be an indication value of the uplink proportion that the UE expects the base station to configure for a HPUE mode of the UE. The reference uplink proportion may be a specific uplink proportion, such as 60%, or may be a quantized value representing the uplink proportion.

In another example of the present disclosure, the SAR capability information may also include a SAR indication value corresponding to a preset uplink proportion. When reporting the SAR capability information, correspondence between the preset uplink proportion and a SAR value can be reported to the base station, for example, (50%, 0.8), which means that after measurement, when the UE transmits information at 50% uplink proportion, the SAR value for measuring radiation to the human body is 0.8 W/Kg. Alternatively, only a SAR value corresponding to a system-agreed uplink proportion is reported to the base station. For example, based on the system-agreed uplink proportion, such as 50%, a corresponding measured SAR value of the UE, such as 0.8 W/Kg, is reported to the base station. Alternatively, only an uplink proportion corresponding to a system-agreed SAR value is reported to the base station. For example, when performing a measurement for the SAR capability information by multiple pieces of UE, it is assumed that the system agrees that each piece of UE reports corresponding uplink proportion in response to that the measured SAR value is 0.8 W/Kg. In the latter two reporting modes, the UE only needs to report one value, and the base station can still obtain the correspondence between a preset uplink proportion and a SAR value according to a system agreement, which can save signaling overhead.

With the explicit manner, if the UE is required to report the preset adjustment function to the base station before switching to a preset HPUE mode, the base station can be quickly and explicitly informed, via the preset indication value represented by 1 bit, that the UE currently supports the preset adjustment function. After the UE switches to the preset HPUE mode, such as power class 2, the UE reports the SAR capability information corresponding to the HPUE mode to the base station. In this way, the base station determines a target uplink proportion for the UE in the HPUE mode according to the SAR capability information corresponding to the HPUE mode.

If the UE sends the supported indication information to the base station in an implicit manner, the UE directly reports SAR capability information corresponding to a preset HPUE mode to the base station when the UE determines that the preset adjustment function is currently supported. Upon receiving the SAR capability information, the base station can determine that the UE currently supports the preset adjustment function, and then determine resource configuration information for the UE in the preset HPUE mode according to the SAR capability information.

With the implicit manner, if the UE is already configured for the preset HPUE mode, it may not need to occupy one bit to report the preset indication value, thereby saving signaling overhead and transmission resources.

At step 123, the target resource configuration information is received, which is dynamically adjusted by the base station based on the SAR capability information.

In the present disclosure, when the base station receives the SAR capability information reported by the UE, while the UE is configured in the preset HPUE mode, the base station can dynamically adjust the uplink proportion in the resource configuration for the UE according to the SAR capability information of the UE and a preset SAR upper limit. In this way, when the UE is operating in the preset HPUE mode, the SAR exceedance will not occur, and uplink information is transmitted by using a maximum uplink proportion to improve uplink transmission performance of the UE. How the base station dynamically adjusts the uplink proportion for the HPUE will be described in detail in the following examples of base station implementation methods.

Figure 4:
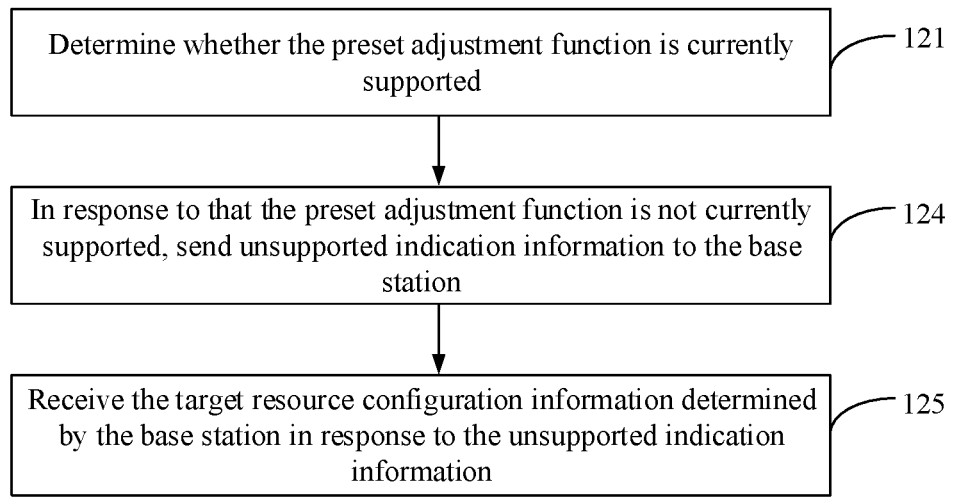
FIG. 4 is a flowchart illustrating another method of transmitting information according to an example of the present disclosure.

Referring to FIG. 4, a flowchart illustrating another method of transmitting information is shown according to an example. After the above step 121, step 12 may further include the following steps.

At step 124, in response to that the preset adjustment function is not currently supported, unsupported indication information is sent to the base station.

In an example of the present disclosure, the UE may determine that the UE itself does not currently support the preset adjustment function according to the opposite of the triggering conditions. For example, for case 1 of trigger condition 1, if the volume of uplink service to be transmitted by the UE is less than the preset uplink traffic threshold, the UE determines that the UE does not currently support the preset adjustment function for the time being.

In the present disclosure, for a preset HPUE mode, the UE may use another preset value of the above bit, such as 0, to indicate that the UE does not currently support dynamically adjusting, by the base station, the uplink proportion in the resource configuration information for the preset HPUE. Thus, the base station is informed that the UE can support the preset adjustment function, and the base station can predict that the UE will turn on the preset adjustment function under a trigger condition, thereby improving the intelligence of the UE.

At step 125, target resource configuration information is received, where the target resource configuration information is determined by the base station in response to the unsupported indication information, and the target resource configuration information includes resource configuration information preset by the base station for the preset high power mode.

In the present disclosure, for a case where the UE does not currently support the preset adjustment function, the base station may determine resource configuration information which the system has preset for all pieces of UE for a preset HPUE mode as target resource configuration information, and send the target resource configuration information to the UE.

Figure 5:
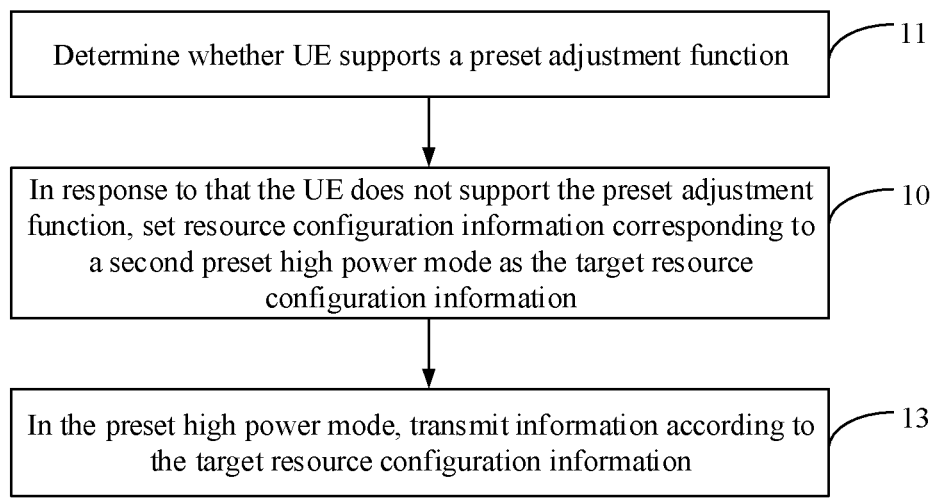
FIG. 5 is a flowchart illustrating another method of transmitting information according to an example of the present disclosure.

If it is determined at step 11 that the UE does not support the preset adjustment function, referring to a flowchart illustrating another method of transmitting information shown in FIG. 5 according to an example, after step 11, the method may further include the followings.

At step 10, in response to that the UE does not support the preset adjustment function, resource configuration information corresponding to a second preset high power mode is set as the target resource configuration information.

As in the above example, if smart phone A does not support a function instructing the base station to dynamically adjust resource configuration information for smart phone A in the preset high power mode based on SAR capability information of smart phone A, the resource configuration information associated with the second preset high power mode can be determined as the target resource configuration information.

The resource configuration information corresponding to the second preset high power mode may be uplink resource configuration information corresponding to a system protocol default HPUE mode. The resource configuration information corresponding to the second preset high power mode may be preset by smart phone A at the factory. Alternatively, the base station sends the resource configuration information to smart phone A via system information when smart phone A initial accesses to the network. For example, at factory settings, a preset uplink proportion, such as 50%, is configured for a HPUE mode (e.g., power class 2 mode) of smart phone A.

Here, it should be noted that one piece of UE can support one or more high power modes. If the UE supports multiple high power modes, the UE may predetermine one piece of resource configuration information for each high-power mode, and an example is shown in Table 1.

TABLE 1

| High power mode | Uplink proportion |
|---|---|
| Power Class 2 | 50% |
| Power Class 1 | 70% |

Power class 2 and power class 1 in Table 1 both belong to the high power mode of the UE, that is, the HPUE mode. The resource configuration information represented by the uplink proportion refers to uplink proportion information determined based on high power transmission capability of the UE radio frequency module and a preset SAR measurement standard (known as a SAR upper limit). In this way, when the UE in the preset HPUE mode transmits uplink information according to the preset uplink proportion, it is ensured that the amount of the wireless signal radiation to the human body will not exceed the SAR upper limit for a designated area. As in the above example, when smart phone A operates in the power class 2 mode and transmits uplink information according to the preset uplink proportion 50%, it is ensured that the amount of radiation of the mobile phone signal to the human body will not exceed the standard, that is, no SAR exceedance will occur.

At step 13, when being in the preset high power mode, information is transmitted according to the target resource configuration information.

In the present disclosure, when the UE determines the target resource configuration information corresponding to the preset high power mode, and when the UE is configured to the preset high power mode, the UE can transmit information according to the target resource configuration information, which includes: in the preset high power mode, the uplink information is transmitted according to the preset uplink proportion. For example, for UE that does not support the preset adjustment function, when the UE is configured to a preset high power mode, such as the power class 2 mode, the UE transmits uplink information according to the predetermined uplink proportion, such as 50%, thereby ensuring that no SAR exceedance will occur during the UE operating in the preset high power mode.

In an example of the present disclosure, for a case that the UE currently supports the preset adjustment function, if the UE receives target configuration information from the base station upon configuring to a preset HPUE mode, the UE can transmit uplink information based on an uplink proportion in the target resource configuration information directly.

If the UE receives the target resource configuration information from the base station before being configured to the preset HPUE mode, when the UE performs transmission configuration in the preset HPUE mode, the UE may first determine whether the received target resource configuration information is valid.

Figure 6:
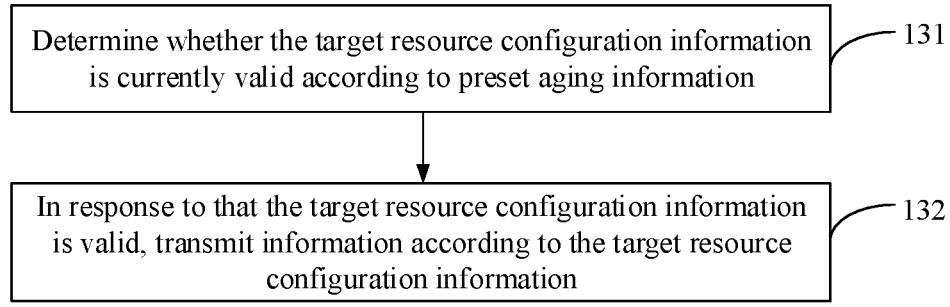
FIG. 6 is a flowchart illustrating another method of transmitting information according to an example of the present disclosure.

Referring to FIG. 6, a flowchart illustrating another method of transmitting information is shown according to an example, step 13 may include the followings.

At step 131, it is determined whether the target resource configuration information is currently valid according to preset aging information.

In the examples of the present disclosure, the system can also set an effective duration for one piece of target resource configuration information. When receiving the target resource configuration information, the UE starts a timer to record an interval between a moment when the UE is ready to use the target resource configuration information for transmission configuration and a reception moment. And then, the UE determines whether the interval exceeds the effective duration. If the interval exceeds the effective duration, it is indicated that the target resource configuration information is already invalid, and the configuration information can be re-acquired. Otherwise, if the interval does not exceed the effective duration, it is indicated that the target resource configuration information is still valid, and the following step 132 is executed.

At step 132, in response to that the target resource configuration information is valid, information is transmitted according to the target resource configuration information.

After determining that the received target resource configuration information is valid, the UE performs the transmission configuration for the preset HPUE mode based on the target resource configuration information. Upon completing the transmission configuration, the UE transmits uplink information by using the uplink transmission resources corresponding to the preset uplink proportion. In this way, the uplink transmission time is adjusted accurately and effectively, thereby ensuring that no SAR exceedance occurs.

Figure 7:
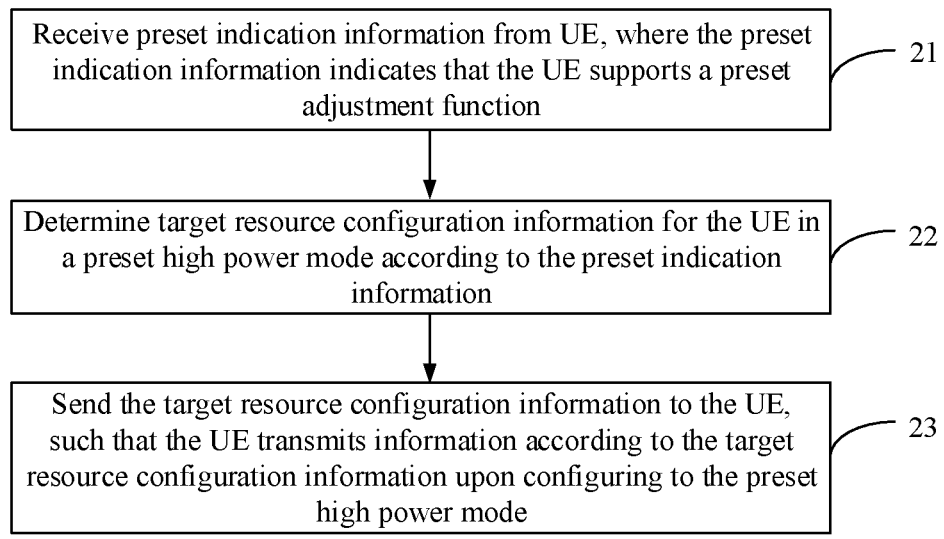
FIG. 7 is a flowchart illustrating a method of transmitting information according to an example of the present disclosure.

Correspondingly, the present disclosure also provides methods of transmitting information, which are applicable to a base station. Referring to FIG. 7, a flowchart illustrating a method of transmitting information is shown according to an example, the method may include the following steps.

At step 21, preset indication information from UE is received. The preset indication information indicates that the UE supports a preset adjustment function, and the preset adjustment function instructs a base station to dynamically adjust resource configuration information for the UE when the UE is in a high power mode (HPUE) based on SAR capability information of the UE.

In the present disclosure, the preset indication information may include the following two types of information.

Supported indication information, which indicates that the UE currently supports the preset adjustment function.

Unsupported indication information, which indicates that the UE supports the preset adjustment function but does not currently support the preset adjustment function.

The supported indication information may include: a preset indication value indicating that the UE currently supports the preset adjustment function, and SAR capability information of the UE in a preset HPUE mode, which corresponds to the UE sending the supported indication information in an explicit manner described above.

In another example of the present disclosure, corresponding to the UE sending the supported indication information in an implicit manner described above, the supported indication information may not include the preset indication value. The supported indication information may include: SAR capability information of the UE in a preset HPUE mode.

The unsupported indication information may include another preset indication value of the above one bit, such as 0.

At step 22, target resource configuration information is determined for the UE in the preset high power mode according to the preset indication information.

Correspondingly, according to the different indication information received from the UE, step 22 may include the following two implementations.

Figure 8:
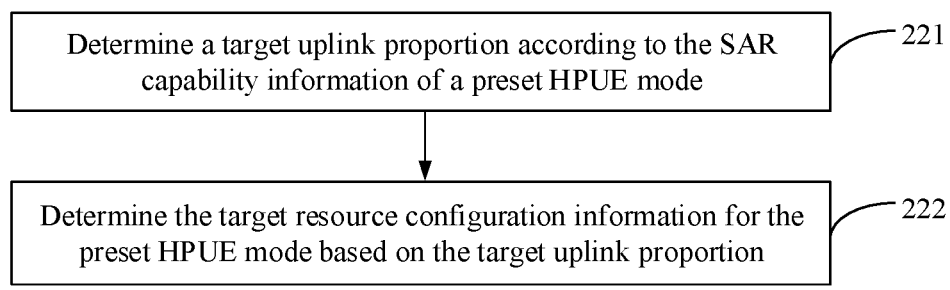
FIG. 8 is a flowchart illustrating another method of transmitting information according to an example of the present disclosure.

In the first implementation, if the base station receives the supported indication information from the UE, where the supported indication information includes at least: the SAR capability information of the UE in the preset HPUE mode. Referring to FIG. 8 a flowchart illustrating another method of transmitting information is shown according to an example, step 22 may include the followings.

At step 221, a target uplink proportion is determined according to the SAR capability information of the preset HPUE mode.

In the present disclosure, the SAR capability information reported by the UE may include a reference uplink proportion, or a SAR indication value corresponding to a preset uplink proportion.

In an example, if the SAR capability information is the reference uplink proportion, the base station may determine the target uplink proportion configured for the HPUE mode according to the reference value.

Exemplarily, if the reference uplink proportion, such as 75%, is the maximum uplink proportion that the UE expects in a preset HPUE mode, such as power class 2, according to its own SAR capability information, a target uplink proportion corresponding to power class 2 configured by the base station for the UE can be less than or equal to 75%.

In another example, if the SAR capability information is the SAR indication value corresponding to the preset uplink proportion, step 221 may include: the target uplink proportion is determined based on the SAR indication value corresponding to the preset uplink proportion and a preset SAR upper limit.

As in the above example, assuming that the base station receives the SAR capability information from the UE, it can be represented as Table 2:

TABLE 2

| Preset high power mode | SAR indication value corresponding to preset uplink proportion |
|---|---|
| Power Class 2 | (50%, 1.0) |

The information shown in Table 2 indicates that, based on radio frequency transmission capability of the UE in a preset high power mode, e.g., power class 2, when the UE transmits uplink information at a 50% uplink proportion, the measured SAR value is 1.0-W/Kg.

Assuming that the preset SAR upper limit is 1.6 W/Kg, which is a regionally specified SAR measurement standard, the base station determines the maximum uplink proportion in the power class 2 mode as 80% for the UE. That is, the base station can adjust the target uplink proportion of the UE in the power class 2 mode to 80%, or slightly less than 80%, such as 78%. If the base station allocates the uplink resources for the UE in the power class 2 mode according to this target uplink proportion, it can ensure that the UE will not exceed the SAR standard and can effectively improve uplink transmission capability of the UE.

At step 222, the target resource configuration information is determined for the preset HPUE mode based on the target uplink proportion.

In the present disclosure, the base station may determine the target resource configuration information for the preset HPUE mode based on the target uplink proportion or a corresponding quantized value thereof. As in the above example, the target configuration information may include a specific uplink proportion, such as 78%. Alternatively, the target configuration information may include a quantized value of the uplink proportion, such as 3, corresponding to the target uplink proportion, such as 78%.

In the second implementation, if the base station receives the unsupported indication information from the UE, step 22 includes:

resource configuration information preset for a preset high power mode is determined as the target resource configuration information of the UE.

As described at step 125, in the present disclosure, for a case where the UE does not currently support the preset adjustment function, the base station may determine resource configuration information which the system has preset for all pieces of UE for a preset HPUE mode as target resource configuration information.

At step 23, the target resource configuration information is sent to the UE, such that upon configuring to the preset high power mode, the UE transmits information according to the target resource configuration information.

As in the above example, according to different application scenarios, the base station may send the target resource configuration information to the UE in response to that the UE is configured to the preset HPUE mode, such that the UE can transmit information according to the target resource configuration information.

In another application scenario, the base station may also send the target resource configuration information before the UE is configured to the preset HPUE mode. And the base station may also send aging information of the target resource configuration information. In this way, the UE can determine, based on the aging information, whether the target resource configuration information is valid during performing transmission configuration in the preset HPUE mode. If the target resource configuration information is valid, information is transmitted based on the target resource configuration information, thereby effectively ensuring that the UE does not have a SAR exceedance.

It should be noted that in the present disclosure, the base station may send the target resource configuration information determined by the second implementation to target UE through broadcast signaling, upper layer signaling, or physical layer downlink signaling. The upper layer signaling may be RRC (Radio Resource Control) signaling, MAC (Medium Access Control) CE (Control Element) signaling.

For the foregoing method examples, for the sake of simplicity, all of them are described as a series of combinations of actions, but those skilled in the art should know that the present disclosure is not limited by the described sequence of actions, because some steps may be performed in other orders or simultaneously according to the present disclosure.

Secondly, those skilled in the art should also know that the examples described in the description all belong to optional examples, and the operations and modules involved are not necessarily required in the present disclosure.

Corresponding to the foregoing method examples for implementing application functions, the present disclosure further provides examples of apparatuses for implementing application functions and corresponding terminals.

Figure 9:
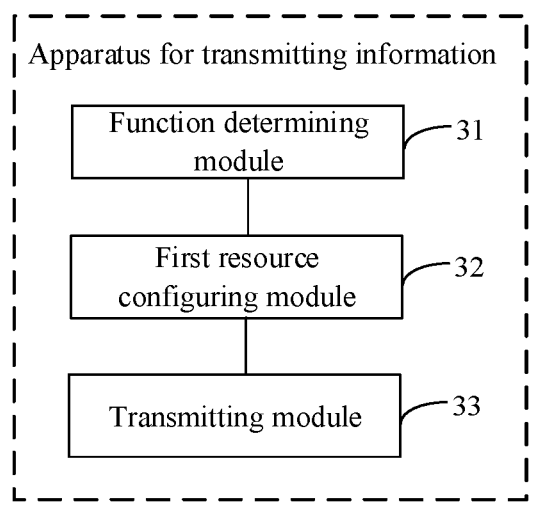
FIG. 9 is a block diagram illustrating an apparatus for transmitting information according to an example of the present disclosure.

Correspondingly, the present disclosure provides apparatuses for transmitting information, which can be applicable to UE. Referring to FIG. 9, a block diagram illustrating an apparatus for transmitting information is shown according to an example, the apparatus may include the followings.

A function determining module 31 is configured to determine whether the UE supports a preset adjustment function, where the preset adjustment function instructs a base station to, based on SAR capability information of the UE, dynamically adjust resource configuration information for the UE when the UE is in a high power mode (HPUE).

A first resource configuring module 32 is configured to determine, in response to that the UE supports the preset adjustment function, target resource configuration information corresponding to a preset high power mode.

A transmitting module 33 is configured to transmit, when being in the preset high power mode, information according to the target resource configuration information.

Figure 10:
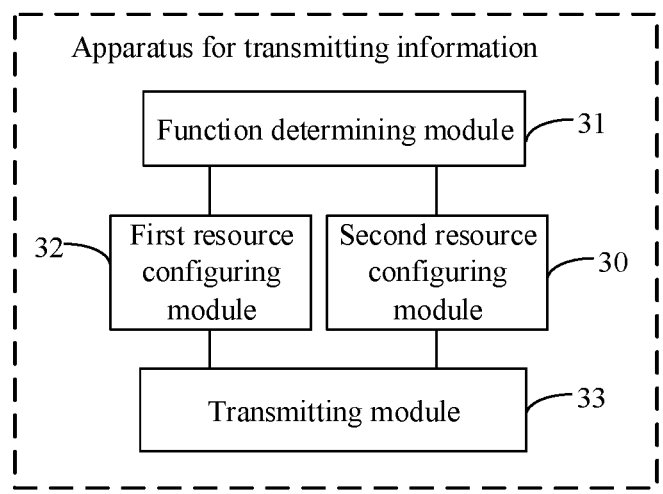
FIG. 10 is a block diagram illustrating another apparatus for transmitting information according to an example of the present disclosure.

Referring to FIG. 10, a block diagram illustrating another apparatus for transmitting information is shown according to an example. On the basis of the apparatus example shown in FIG. 9, the apparatus may further include:

a second resource configuring module 30 configured to set, in response to that the UE does not support the preset adjustment function, resource configuration information corresponding to a second preset high power mode as the target resource configuration information.

Figure 11:
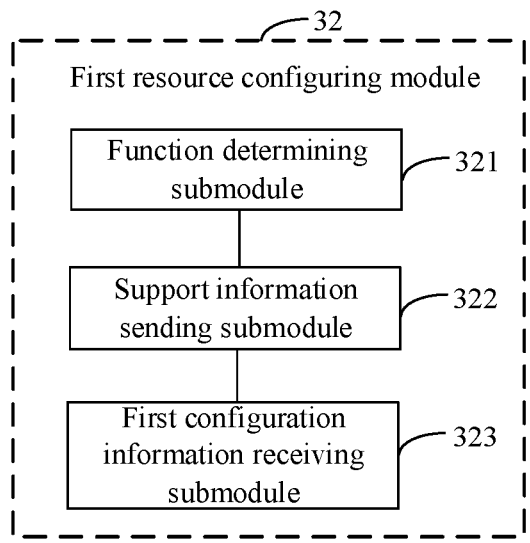
FIG. 11 is a block diagram illustrating another apparatus for transmitting information according to an example of the present disclosure.

Referring to FIG. 11, a block diagram illustrating another apparatus for transmitting information is shown according to an example. On the basis of the apparatus example shown in FIG. 9, the first resource configuring module 32 may include the following submodules.

A function determining submodule 321 is configured to determine whether the UE currently supports the preset adjustment function.

A support information sending submodule 322 is configured to send, in response to that the preset adjustment function is currently supported, supported indication information to the base station, where the supported indication information includes the SAR capability information of the UE.

In the present disclosure, the support information sending submodule 322 may be configured to send the supported indication information to the base station is triggered by at least one that:

volume of service to be transmitted by the UE meets a preset traffic condition;

the UE moves to a preset cell edge area;

power consumption of the UE meets a preset power consumption condition; or area movement information of the UE meets a preset terminal control condition.

A first configuration information receiving submodule 323 is configured to receive the target resource configuration information dynamically adjusted by the base station based on the SAR capability information.

In the apparatus examples of the present disclosure, the SAR capability information may include: a reference uplink proportion, or a SAR indication value corresponding to a preset uplink proportion.

Figure 12:
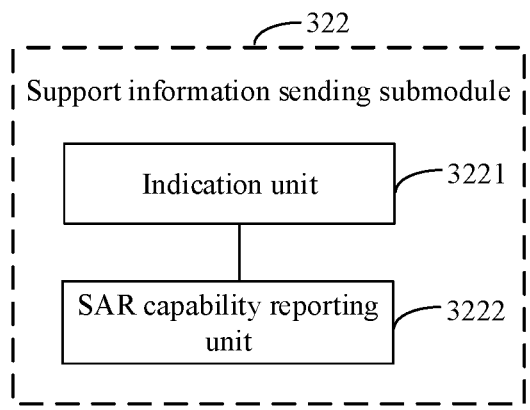
FIG. 12 is a block diagram illustrating another apparatus for transmitting information according to an example of the present disclosure.

Referring to FIG. 12, a block diagram illustrating another apparatus for transmitting information is shown according to an example. On the basis of the apparatus example shown in FIG. 11, the support information sending 322 may include the following units.

An indication unit 3221 is configured to send, to the base station, a preset indication value indicating that the UE currently supports the preset adjustment function.

A SAR capability reporting unit 3222 is configured to send, to the base station, the SAR capability information corresponding to the preset high power mode, such that the base station dynamically adjusts the resource configuration information based on the SAR capability information.

Corresponding to the foregoing manner of implicitly indicating that the UE supports the preset adjustment function, in another apparatus example of the present disclosure for transmitting information, the support information sending submodule 322 may also include only the SAR capability reporting unit 3222.

Figure 13:
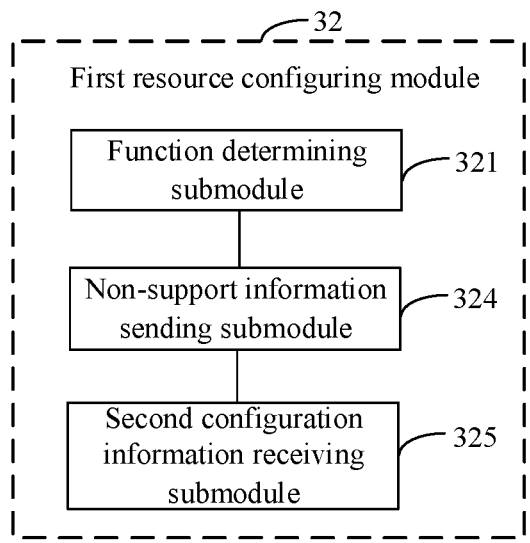
FIG. 13 is a block diagram illustrating another apparatus for transmitting information according to an example of the present disclosure.

Referring to FIG. 13, a block diagram illustrating another apparatus for transmitting information is shown according to an example. Based on the apparatus example shown in FIG. 11, the first resource configuring module 32 may further include the following submodules.

A non-support information sending submodule 324 is configured to send, in response to that the preset adjustment function is not currently supported, unsupported indication information to the base station.

A second configuration information receiving submodule 325 is configured to receive the target resource configuration information determined by the base station in response to the unsupported indication information, where the target resource configuration information includes resource configuration information preset by the base station for the preset high power mode.

Figure 14:
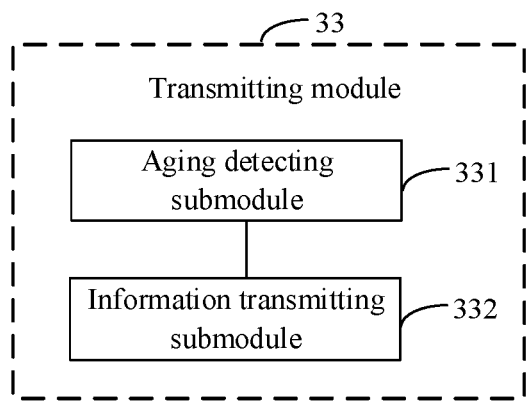
FIG. 14 is a block diagram illustrating another apparatus for transmitting information according to an example of the present disclosure.

Referring to FIG. 14, a block diagram illustrating another apparatus for transmitting information is shown according to an example. On the basis of the apparatus example shown in FIG. 9, the transmitting module 33 may include the followings.

An aging detecting submodule 331 is configured to determine whether the target resource configuration information is currently valid according to preset aging information.

An information transmitting submodule 332 is configured to transmit, in response to that the target resource configuration information is valid, information according to the target resource configuration information.

Figure 15:
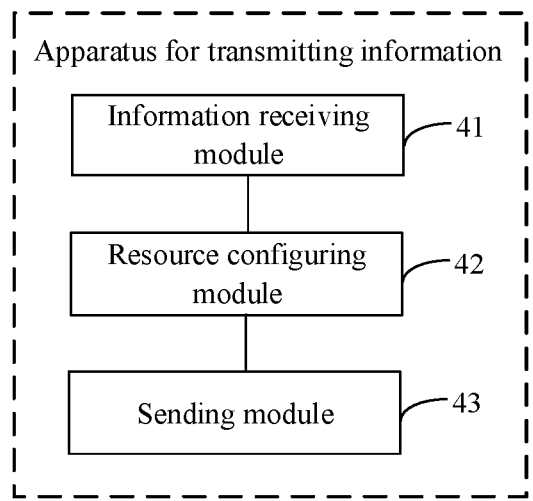
FIG. 15 is a block diagram illustrating an apparatus for transmitting information according to an example of the present disclosure.

Correspondingly, the present disclosure also provides apparatuses for transmitting information, which are applicable to a base station. Referring to FIG. 15, a block diagram illustrating an apparatus for transmitting information is shown according to an example. The apparatus may include the following modules.

An information receiving module 41 is configured to receive preset indication information from UE, where the preset indication information indicates that the UE supports a preset adjustment function, and the preset adjustment function instructs the base station to, based on SAR capability information of the UE, dynamically adjust resource configuration information for the UE when the UE is in a high power mode (HPUE).

A resource configuring module 42 is configured to determine target resource configuration information for the UE in a preset high power mode according to the preset indication information.

A sending module 43 is configured to send the target resource configuration information to the UE, such that the UE transmits information according to the target resource configuration information when the UE is configured in the preset high power mode.

Figure 16:
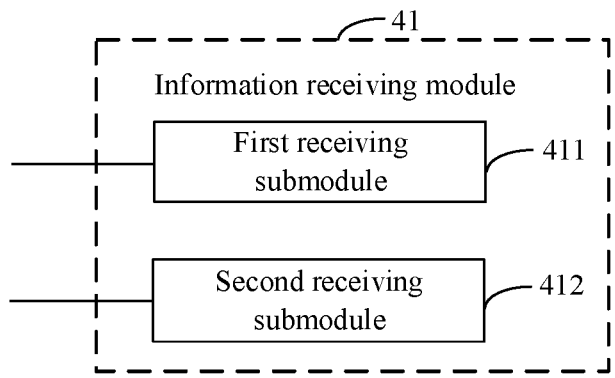
FIG. 16 is a block diagram illustrating another apparatus for transmitting information according to an example of the present disclosure.

Referring to FIG. 16, a block diagram illustrating another apparatus for transmitting information is shown according to an example. On the basis of the apparatus example shown in FIG. 15, the information receiving module 41 may include the followings.

A first receiving submodule 411 is configured to receive a preset indication value and the SAR capability information corresponding to the preset high power mode from the UE, where the preset indication value indicates that the UE currently supports the preset adjustment function.

A second receiving submodule 412 is configured to receive the SAR capability information corresponding to the preset high power mode from the UE.

Figure 17:
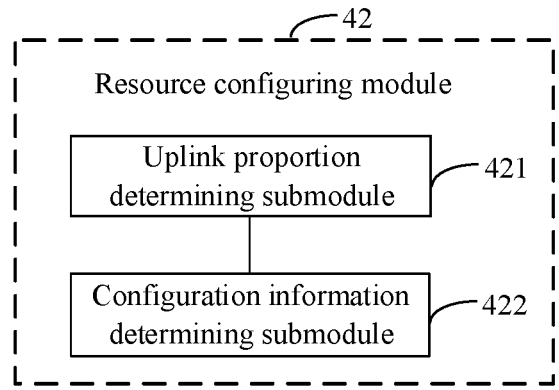
FIG. 17 is a block diagram illustrating another apparatus for transmitting information according to an example of the present disclosure.

Referring to FIG. 17, a block diagram illustrating another apparatus for transmitting information is shown according to an example. On the basis of the apparatus example shown in FIG. 16, the resource configuring module 42 may include the followings.

An uplink proportion determining submodule 421 is configured to determine a target uplink proportion according to the SAR capability information.

A configuration information determining submodule 422 is configured to determine the target resource configuration information for the preset high power mode based on the target uplink proportion.

Figure 18:
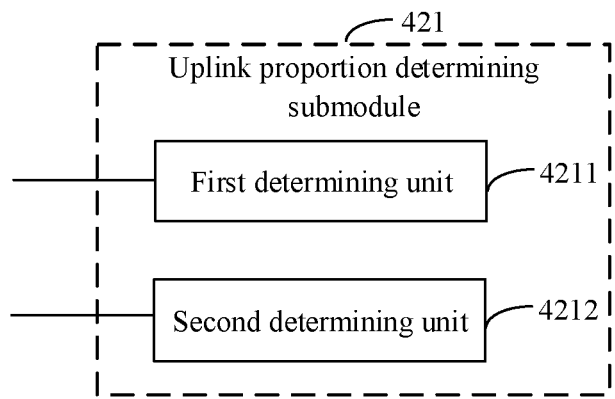
FIG. 18 is a block diagram illustrating another apparatus for transmitting information according to an example of the present disclosure.

Referring to FIG. 18, a block diagram illustrating another apparatus for transmitting information is shown according to an example. On the basis of the apparatus example shown in FIG. 17, if the SAR capability information received by the first receiving submodule 411 or the second receiving submodule 412 includes a reference uplink proportion, the uplink proportion determining submodule 421 may include:

a first determining unit 4211 configured to determine the target uplink proportion according to the reference uplink proportion, where the target uplink proportion is less than or equal to the reference uplink proportion.

If the SAR capability information received by the first receiving submodule 411 or the second receiving submodule 412 includes a SAR indication value corresponding to a preset uplink proportion, the uplink proportion determining submodule 421 may include:

a second determining unit 4212 configured to determine the target uplink proportion according to a preset SAR upper limit and the SAR indication value corresponding to the preset uplink proportion.

Figure 19:
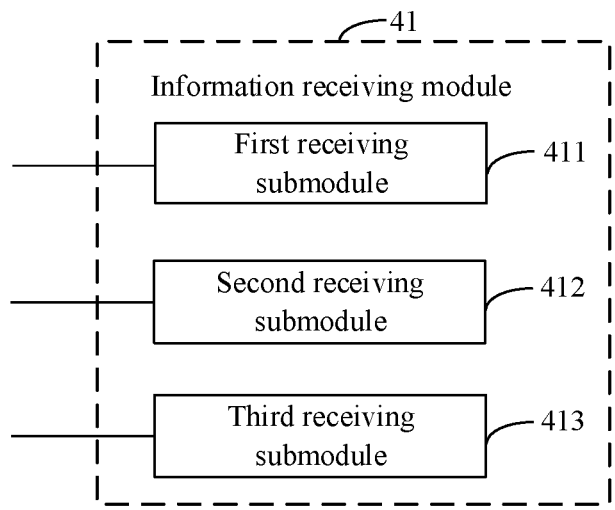
FIG. 19 is a block diagram illustrating another apparatus for transmitting information according to an example of the present disclosure.

Referring to FIG. 19, a block diagram illustrating another apparatus for transmitting information is shown according to an example. On the basis of the apparatus example shown in FIG. 16, the information receiving module 41 may further include a third receiving submodule.

The third receiving submodule 413 is configured to receive unsupported indication information from the UE. And the resource configuring module 43 is configured to determine resource configuration information preset for the preset high power mode as the target resource configuration information for the UE.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, on the one hand, UE is provided, including:

a processor, and a memory for storing instructions executable by the processor, where, the processor is configured to:

determine whether the UE supports a preset adjustment function, where the preset adjustment function instructs a base station to, based on SAR capability information of the UE, dynamically adjust resource configuration information for the UE when the UE is in a high power mode (HPUE);

determine, in response to that the UE supports the preset adjustment function, target resource configuration information corresponding to a preset high power mode; and transmit, when being in the preset high power mode, information according to the target resource configuration information.

On the other hand, a base station is provided, including:

a processor, and a memory for storing instructions executable by the processor, where, the processor is configured to:

receive preset indication information from UE, where the preset indication information indicates that the UE supports a preset adjustment function, and the preset adjustment function instructs the base station to, based on SAR capability information of the UE, dynamically adjust resource configuration information for the UE when the UE is in a high power mode (HPUE);

determine target resource configuration information for the UE in a preset high power mode according to the preset indication information; and send the target resource configuration information to the UE, such that the UE transmits information according to the target resource configuration information when the UE is configured in the preset high power mode.

Figure 20:
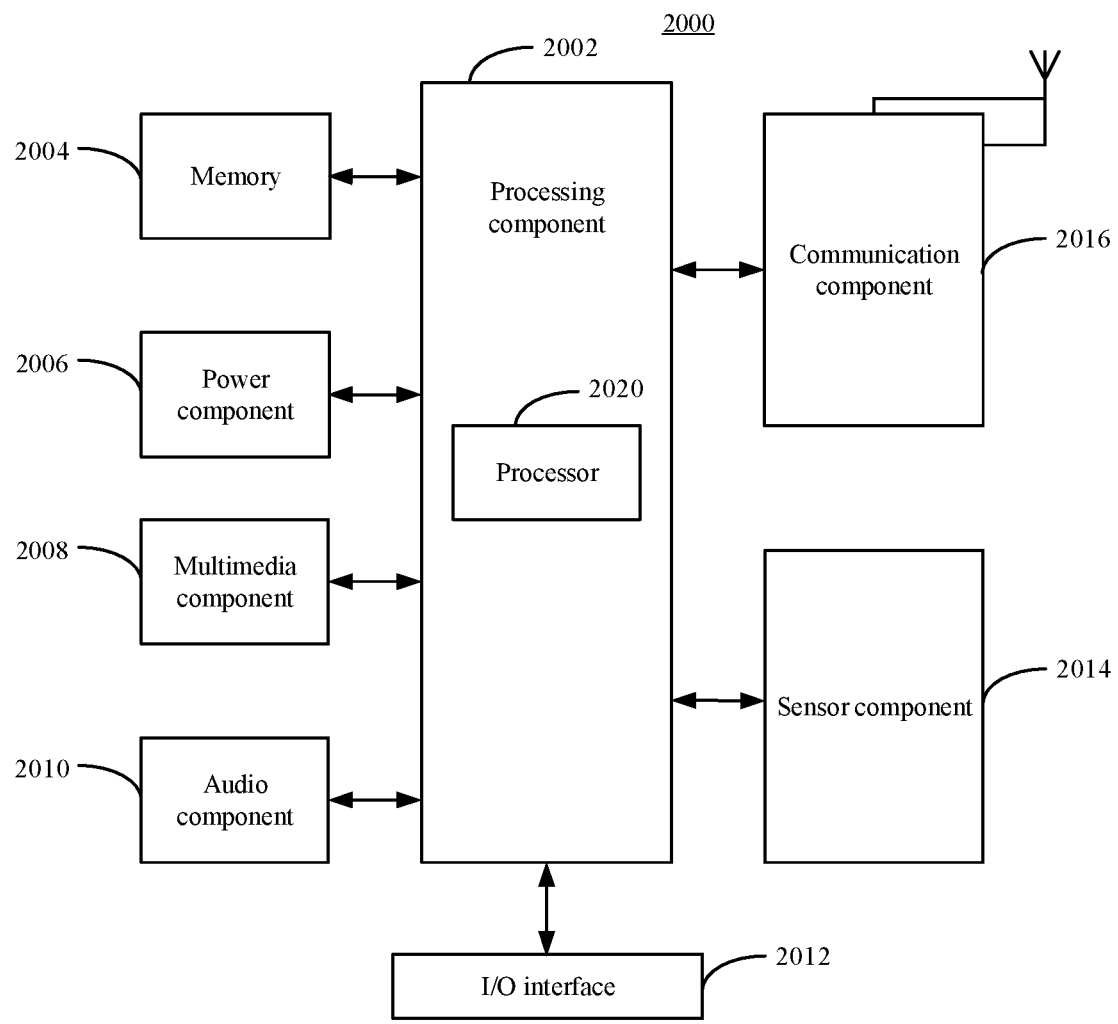
FIG. 20 is a schematic structural diagram illustrating user equipment according to an example of the present disclosure.

FIG. 20 is a schematic structural diagram illustrating user equipment 2000 according to an example. For example, the user equipment 2000 may be a terminal in a network, such as LTE, 5G NR, and so on. The user equipment 2000 may be a mobile phone, a computer, a digital broadcast terminal, a messaging device, a game console, a tablet device, a medical equipment, a fitness equipment, a personal digital assistant, a wearable device such as a smart watch, smart glasses, a smart bracelet, smart running shoes, and so on.

Referring to FIG. 20, the apparatus 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 usually controls the overall operation of the apparatus 2000, such as operations associated with display, telephone calls, data communications, camera operations, and recording operations. The processing component 2002 may include one or more processors 2020 to execute instructions to perform all or part of the steps in the methods described above. Moreover, the processing component 2002 may include one or more modules to facilitate interaction between the processing component 2002 and other components. For example, the processing component 2002 may include a multimedia module to facilitate interaction between the multimedia component 2008 and the processing component 2002.

The memory 2004 is configured to store various types of data to support operation at the user equipment 2000. Examples of these data include instructions for any application or method operating at the user equipment 2000, contact data, phone book data, messages, pictures, videos, and the like. The memory 2004 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 2006 provides power to various components of the apparatus 2000. The power component 2006 may include a power management system, one or more power sources, and other components associated with power generated, managed, and distributed for the apparatus 2000.

The multimedia component 2008 includes a screen that provides an output interface between the apparatus 2000 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2008 includes a front camera and/or a rear camera. When the user equipment 2000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2010 is configured to output and/or input audio signals. For example, the audio component 2010 includes a microphone (MIC) configured to receive an external audio signal when the apparatus 2000 is in an operation mode, such as a call mode, a recording mode, and a voice recognition mode. The received audio signal may be further stored in the memory 2004 or transmitted via the communication component 2016. In some examples, the audio component 2010 also includes a loudspeaker for outputting an audio signal.

The I/O interface 2012 provides an interface between the processing component 2002 and a peripheral interface module which may be a keyboard, a click wheel, a button, or the like. These buttons may include, but are not limited to a home button, a volume button, a start button, and a lock button.

The sensor component 2014 includes one or more sensors for providing a status assessment in various aspects to the apparatus 2000. For example, the sensor component 2014 may detect an open/closed state of the apparatus 2000, and the relative positioning of components, for example, the component is a display and a keypad of the apparatus 2000. The sensor component 2014 may also detect a change in position of the user equipment 2000 or a component of the apparatus 2000, the presence or absence of a user in contact with the apparatus 2000, the orientation or acceleration/deceleration of the apparatus 2000 and a change in temperature of the apparatus 2000. The sensor component 2014 may include a proximity sensor configured to detect the presence of nearby objects without any physical contact. The sensor component 2014 may also include a light sensor, such as a CMOS or CCD image sensor, for use in imaging applications. In some examples, the sensor component 2014 may also include an acceleration sensor, a gyro sensor, a magnetic sensor, a pressure sensor, or a temperature sensor.

The communication component 2016 is configured to facilitate wired or wireless communication between the apparatus 2000 and other devices. The apparatus 2000 may access a wireless network based on a communication standard, such as WiFi, 2G, 3G, 4G LTE, 5G NR, or a combination thereof. In an example, the communication component 2016 receives broadcast signals or broadcast associated information from an external broadcast management system via a broadcast channel. In an example, the communication component 2016 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 2000 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 2004 including instructions, where the instructions are executable by the processor 2020 of the apparatus 2000 to perform any of the methods of transmitting information as shown in FIGS. 1 to 6. For example, the non-transitory computer readable storage medium may be a ROM, a random access memory (RAM), a CD-ROM, a magnetic tape, a floppy disk, and an optical data storage device.

Figure 21:
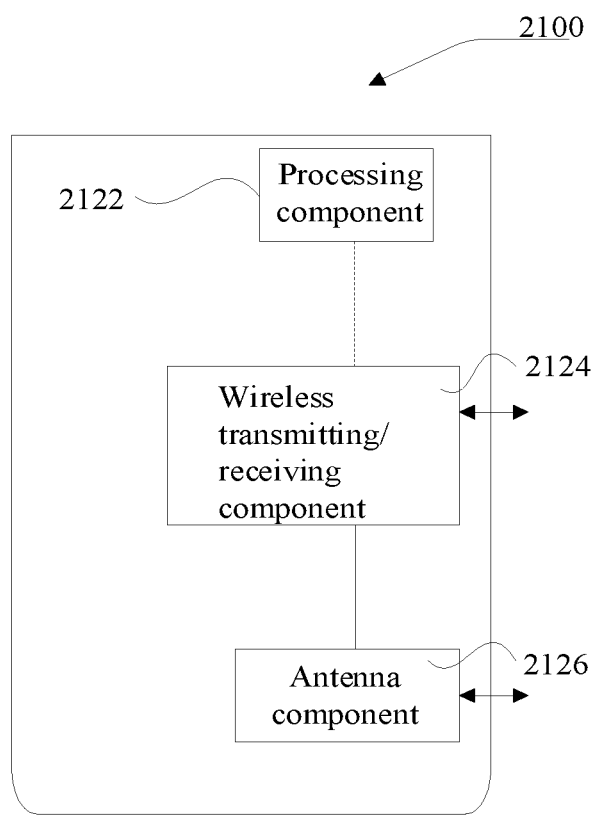
FIG. 21 is a schematic structural diagram illustrating a base station according to an example of the present disclosure.

As shown in FIG. 21, a schematic structural diagram illustrates a base station 2100 according to an example. The base station can be used in LTE, 5G NR and other networks. Referring to FIG. 21, the apparatus 2100 includes a processing component 2122, a wireless transmitting/receiving component 2124, an antenna component 2126, and a signal processing portion specific to a wireless interface. The processing component 2122 may further include one or more processors.

One of the processors in the processing component 2122 may be configured to receive preset indication information from UE, where the preset indication information indicates that the UE supports a preset adjustment function, and the preset adjustment function instructs the base station to, based on SAR capability information of the UE, dynamically adjust resource configuration information for the UE when the UE is in a high power mode (HPUE);

determine target resource configuration information for the UE in a preset high power mode according to the preset indication information; and send the target resource configuration information to the UE, such that the UE transmits information according to the target resource configuration information when the UE is configured in the preset high power mode.

In an example, there is also provided a non-transitory computer readable storage medium storing computer instructions, where the computer instructions are executable by the processing component 2122 of the base station 2100 to perform any of the methods of transmitting information as shown in FIGS. 7 to 9. For example, the non-transitory computer readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

What is claimed is:

1. A method of transmitting information, comprising:
   determining, by a user equipment (UE), whether the UE supports a preset adjustment function, wherein the preset adjustment function instructs a base station to, based on specific absorption rate (SAR) capability information of the UE, dynamically adjust resource configuration information for the UE when the UE is in a high power mode (HPUE), and a transmission power of the HPUE is larger than 23 dBm;
   determining, in response to determining that the UE supports the preset adjustment function, whether the UE currently requires the preset adjustment function based on a preset reference factor;
   sending, by the UE, in response to determining that the preset adjustment function is currently required, supported indication information to the base station, wherein the supported indication information comprises the SAR capability information of the UE;
   receiving, by the UE, target resource configuration information dynamically adjusted by the base station based on the SAR capability information, wherein the target resource configuration information corresponds to a preset high power mode; and
   transmitting, when the UE is in the preset high power mode, information according to the target resource configuration information.

2. The method of claim 1, further comprising:
   setting, in response to that the UE does not support the preset adjustment function, resource configuration information corresponding to a second preset high power mode as the target resource configuration information.

3. The method of claim 1, wherein the SAR capability information comprises:
   a reference uplink proportion, or
   a SAR indication value corresponding to a preset uplink proportion.

4. The method of claim 3, wherein the reference uplink proportion includes an indication value of an uplink proportion that the UE expects the base station to configure for the high power mode of the UE.

5. The method of claim 1, wherein sending the supported indication information to the base station is triggered by at least one of following conditions:
   volume of service to be transmitted by the UE meets a preset traffic condition;
   the UE moves to a preset cell edge area;
   power consumption of the UE meets a preset power consumption condition; or
   area movement information of the UE meets a preset terminal control condition.

6. The method of claim 1, wherein sending the supported indication information to the base station comprises:
   sending, to the base station, a preset indication value indicating that the UE currently requires the preset adjustment function; and/or
   sending, to the base station, the SAR capability information corresponding to the preset high power mode, such that the base station dynamically adjusts the resource configuration information based on the SAR capability information.

7. The method of claim 1, wherein transmitting the information according to the target resource configuration information comprises:
   determining whether the target resource configuration information is currently valid according to preset aging information; and
   transmitting, in response to determining that the target resource configuration information is valid, the information according to the target resource configuration information.

8. The method of claim 1, wherein the preset reference factor comprises at least one of:
   volume of service to be transmitted,
   a current power consumption status,
   location information within a signal coverage area of a cell, or
   a terminal control factor.

9. A method of transmitting information, comprising:
   receiving, by a base station, preset indication information from a user equipment (UE), wherein the preset indication information indicates that the UE supports a preset adjustment function, the preset adjustment function instructs the base station to, based on specific absorption rate (SAR) capability information of the UE, dynamically adjust resource configuration information for the UE when the UE is in a high power mode (HPUE), the preset indication information is sent in response to determining that the UE currently requires the preset adjustment function based on a preset reference factor, and a transmission power of the HPUE is larger than 23 dBm;
   determining, by the base station, target resource configuration information for the UE in a preset high power mode according to the preset indication information; and
   sending, by the base station, the target resource configuration information to the UE, such that the UE transmits information according to the target resource configuration information when the UE is configured in the preset high power mode.

10. The method of claim 9, wherein
   receiving the preset indication information from the UE comprises:
      receiving a preset indication value and the SAR capability information corresponding to the preset high power mode from the UE, wherein the preset indication value indicates that the UE currently requires the preset adjustment function; or
      receiving the SAR capability information corresponding to the preset high power mode from the UE; and
   determining the target resource configuration information for the UE in the preset high power mode according to the preset indication information comprises:
      determining a target uplink proportion according to the SAR capability information; and determining the target resource configuration information for the preset high power mode based on the target uplink proportion.

11. The method of claim 10,
wherein the SAR capability information comprises a reference uplink proportion; and
wherein determining the target uplink proportion according to the SAR capability information comprises:
determining the target uplink proportion according to the reference uplink proportion, wherein the target uplink proportion is less than or equal to the reference uplink proportion.

12. The method of claim 11, wherein the reference uplink proportion includes an indication value of an uplink proportion that the UE expects the base station to configure for the high power mode of the UE.

13. The method of claim 10,
wherein the SAR capability information comprises a SAR indication value corresponding to a preset uplink proportion; and
wherein determining the target uplink proportion according to the SAR capability information comprises:
determining the target uplink proportion according to a preset SAR upper limit and the SAR indication value corresponding to the preset uplink proportion.

14. The method of claim 9, wherein the preset reference factor comprises at least one of:
volume of service to be transmitted,
a current power consumption status,
location information within a signal coverage area of a cell, or
a terminal control factor.

15. A user equipment (UE), comprising:
a processor, and
a memory for storing instructions executable by the processor,
wherein, the processor is configured to:
determine whether the UE supports a preset adjustment function, wherein the preset adjustment function instructs a base station to, based on specific absorption rate (SAR) capability information of the UE, dynamically adjust resource configuration information for the UE when the UE is in a high power mode (HPUE), and a transmission power of the HPUE is larger than 23 dBm;
determine, in response to determining that the UE supports the preset adjustment function, whether the UE currently requires the preset adjustment function based on a preset reference factor;
send, in response to determining that the preset adjustment function is currently required, supported indication information to the base station, wherein the supported indication information comprises the SAR capability information of the UE;
receive, target resource configuration information dynamically adjusted by the base station based on the SAR capability information, wherein the target resource configuration information corresponds to a preset high power mode; and
transmit, when being in the preset high power mode, information according to the target resource configuration information.

16. The user equipment of claim 15, wherein the processor is further configured to:
set, in response to that the UE does not support the preset adjustment function, resource configuration information corresponding to a second preset high power mode as the target resource configuration information.

17. The user equipment of claim 15, wherein sending the supported indication information to the base station is triggered by at least one of that:
volume of service to be transmitted by the UE meets a preset traffic condition;
the UE moves to a preset cell edge area;
power consumption of the UE meets a preset power consumption condition; or
area movement information of the UE meets a preset terminal control condition.

18. The user equipment of claim 15, wherein sending the supported indication information to the base station comprises:
sending, to the base station, a preset indication value indicating that the UE currently requires the preset adjustment function; and/or
sending, to the base station, the SAR capability information corresponding to the preset high power mode, such that the base station dynamically adjusts the resource configuration information based on the SAR capability information.

19. A base station, comprising:
a processor, and
a memory for storing instructions executable by the processor,
wherein, the processor is configured to implement the method according to claim 9.

* * * * *